United States Patent [19]
Rosenau et al.

[11] Patent Number: 5,011,884
[45] Date of Patent: Apr. 30, 1991

[54] BLENDS OF THERMOTROPIC POLYMERS WITH POLYESTERS AND POLYCARBONATE

[75] Inventors: Bernhard Rosenau, Neustadt; Bernd Hisgen, Limburgerhof; Gerhard Heinz, Weisenheim; Hans-Georg Braun, Gruenstadt; Dietrich Lausberg; Hartmut Zeiner, both of Ludwigshafen, all of Fed. Rep. of Germany

[73] Assignee: BASF Aktiengesellschaft, Ludwigshafen, Fed. Rep. of Germany

[21] Appl. No.: 401,236

[22] Filed: Aug. 31, 1989

[30] Foreign Application Priority Data

Sep. 20, 1988 [DE] Fed. Rep. of Germany ....... 3831873

[51] Int. Cl.5 .................. C08L 69/00; C08L 67/02; C08L 67/03; C08L 67/04
[52] U.S. Cl. ................................. 524/537; 525/439
[58] Field of Search .................... 525/439; 524/537

[56] References Cited

U.S. PATENT DOCUMENTS 3,953,539  4/1976  Kawase ..................... 525/439
4,189,549  2/1980  Matsunaga ................ 528/193
4,408,022 10/1983  Cincotta et al. ........... 525/444
4,414,230 11/1983  Hanabata ................... 525/439
4,565,850  1/1986  Prevorsek et al. ......... 525/425
4,833,229  5/1989  Magagnini et al. ......... 528/193

FOREIGN PATENT DOCUMENTS 0030417  6/1981  European Pat. Off. .
0044175  1/1982  European Pat. Off. .
0080273  6/1983  European Pat. Off. .
 093407  5/1985  Japan ....................... 525/439
 048852  2/1989  Japan ....................... 525/439
2078240  1/1982  United Kingdom .

Primary Examiner—John C. Bleutge
Assistant Examiner—David Buttner
Attorney, Agent, or Firm—Oblon, Spivak, McClelland, Maier & Neustadt

[57] ABSTRACT

A polymeric molding composition contains
(a) 20-70% by weight of a thermotropic, liquid-crystalline polymer
(b) 10-50% by weight of a polycarbonate
(c) 10-50% by weight of a polyester, the weight percentages (a), (b) and (c) adding up to 100, and
(d) up to 60% by weight, based on the total amount of proportions (a), (b) and (c), of further polymers, fillers, reinforcing agents, processing aids or other additives, and is used for producing moldings, fibers, films or coatings.

8 Claims, No Drawings

BLENDS OF THERMOTROPIC POLYMERS WITH POLYESTERS AND POLYCARBONATE

Thermotropic polymers are in particular partly or wholly aromatic liquid-crystalline polyesters and polyester amides (LCPs) which are processible from the anisotropic melt. They are known inter alia from the following publications: U.S. Pat. Nos. 3,804,805, 3,991,014, 4,156,070, 4,161,470, 4,181,792, 4,351,918, 4,370,466, 4,377,681, 4,390,681, 4,614,790, EP-A-226,839, EP-S-139,303, EP-A-230,545.

Their outward characteristic is an optically anisotropic melt, identifiable inter alia between crossed polarizers and on shearing (shear opalescence). In addition, their viscosity is highly shear rate dependent, and their melt viscosity is lower, by orders of magnitude, than that of conventional, isotropic thermoplastics. In the course of processing, the longitudinal axes of thermotropic polymers can be oriented, so that articles molded from these materials have an anisotropic structure. This leads to excellent stiffness and toughness and a high modulus of elasticity, in particular in the direction of processing. A further advantage of thermotropic polymers over other polymers is their appreciably lower thermal linear expansion coefficients, adjustable in the course of processing; this is particularly advantageous for use in combinations with metals or glass, for example in glass fiber optics for coating optical fibers and for fabricating precision plug connections for such fibers.

Owing to the highly anisotropic structure, moldings from LCPs, however, are sensitive to bending stress; their fracture characteristics resemble those of wood.

This sensitivity to bending is one of the main obstacles to using LCPs for coating optical glass fibers, for which they would otherwise be highly qualified owing to their good strength characteristics and the abovementioned low linear thermal expansion coefficients.

The resistance to bending can be assessed inter alia in a bending test according to German Standards Specification DIN No. 53452. If LCP moldings are subjected to this bending test, it is found that 100% of the specimens break before an extreme fiber elongation of 3.5% is reached. Similarly with conventional thermoplastic polyesters: normally at least some of the specimens fail by breaking. For instance, if this test is carried out on polyalkylene terephthalate moldings, generally at least some of the test specimens break before an extreme fiber elongation of 3.5% is reached.

It is true that test specimens made of polycarbonate (PC) do not break, but the stress-strain diagram reveals an element of yielding; that is, the deformation has a plastic (creep) component.

Blends of PC with small proportions (<20%) of LCPs, primarily as viscosity improvers, are described in EP-A-30,417 and those with high LCP proportions in EP-A-44,175. However, although binary blends of polycarbonate with up to 30% of LCPs have the requisite breaking strength, like polycarbonate itself, they do not have satisfactory melt viscosity, nor do they have a thermal expansion coefficient within the desired range. Increasing the LCP proportion again leads to failure on bending.

Blends of polyalkylene terephthalates with LCPs are described inter alia in GB-A-2,078,240, U.S. Pat. No. 4,408,022, EP-A-30,417, EP-A-88,286 and EP-A-80,273. However, binary blends of PETP and LCPs, like PETP itself, do not have the desired breaking strength.

Blends of polyalkylene terephthalates with PC are also known; they possess a high level of mechanical properties and thermal expansion coefficients of the order of magnitude typical of isotropic thermoplastic materials.

We have found that certain ternary blends of the thermoplastics mentioned which contain 20-70% of LCPs, 10-50% of PC and 10-50% of polyester, preferably polyalkylene terephthalate, are able to withstand considerable bending stresses without breaking while surprisingly retaining the abovementioned advantages of LCP materials, namely an excellent fluidity of the melt and a low, adjustable thermal expansion coefficient. They are thus excellently processible and highly suitable for the abovementioned applications in combination with glass or metal.

This fact is surprising in particular because the desired combination of advantageous properties, namely breaking strength, low thermal expansion coefficient and low melt viscosity, is not achievable with a single one of the materials alone, nor by mixtures of any two of the three materials.

The present invention accordingly provides directly a polymeric molding composition containing (a) from 20 to 70% by weight of a thermotropic, liquid-crystalline polymer (b) from 10 to 50% by weight of a polycarbonate (c) from 10 to 50% by weight of a polyester, the weight percentages (a), (b) and (c) adding up to 100% by weight, and (d) up to 60% by weight, based on the total amount of proportions (a), (b) and (c) of further polymers, fillers, reinforcing agents, processing aids or other additives.

Preferably, the molding composition contains from 30 to 60% by weight of a liquid-crystalline polymer, from 30 to 50% by weight of polycarbonate and from 10 to 20% by weight of polyester.

Another, similarly preferred molding composition contains from 30 to 60% by weight of liquid-crystalline polymer, from 10 to 20% by weight of polycarbonate and from 30 to 50% by weight of polyester.

Typical thermoplastic molding compositions of the type defined have a linear thermal expansion coefficient of less than 30 ppm/K in at least one direction.

Suitable polyesters for the blend according to the invention are in particular those thermoplastics obtainable from alkylene glycols of 2-20 carbon atoms and aromatic dicarboxylic acids or esters thereof by polycondensation. It is also possible to use mixtures of various alkylene glycols and/or various dicarboxylic acids. Preferred alkylene glycols are ethanediol and 1,4-butanediol, while preferred dicarboxylic acids are terephthalic acid, isophthalic acid, and 1,4-, 1,5-, 2,6- or 2,7-naphthalenedicarboxylic acid. Particularly advantageous polyesters are polyethylene terephthalate and polybutylene terephthalate.

The relative viscosity of suitable polyesters is in general within the range from 1.2 to 1.8 dl/g (measured in a 0.5% strength by weight solution in a 1:1 w/w phenol/o-dichlorobenzene mixture at 25° C.).

Suitable polycarbonates for the blend according to the invention are those polycondensates obtainable from aromatic bisphenols of the formula

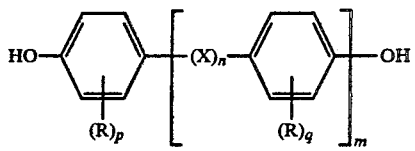

where
X is alkylene or aralkylene of 1–20 carbon atoms, —$SO_2$—, —S—, —O— or —CO—,
n is 0 or 1,
m is 0, 1 or 2,
p and q are each 0–4 and
R is $C_1$–$C_6$-alkyl, $C_1$–$C_4$-alkoxy, halogen (Cl, Br) or phenyl, by reaction with carbonic acid derivatives (for example by reaction with phosgene by the phase interface technique).

Even polycarbonates which have been prepared from a mixture of a plurality of the bisphenols defined above or which in addition to the carbonic acid radical contain radicals of other dibasic organic acids, i.e. polyester carbonate, can be advantageous for the blend according to the invention.

It is particularly advantageous to use the polycarbonate of the formula

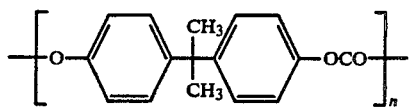

obtainable from bisphenol A and carbonic acid derivatives.

The relative viscosity of suitable polycarbonates is in general within the range from 1.2 to 1.5, preferably from 1.28 to 1.40, dl/g, measured in a 0.5% strength by weight solution in dichloromethane at 25° C.

As well as the three main components the molding composition according to the invention may additionally contain up to 60, preferably up to 50, % by weight (based on the total weight of the main components) of further polymers, fibrous and pulverulent fillers and reinforcing materials and other additives.

Additives are for example stabilizers against thermal and oxidative degradation or against ultraviolet radiation, lubricants, demolding and nucleating agents, colorants such as dyes and pigments, and plasticizers.

Suitable further polymers are for example elastomers or fluoroelastomers, amorphous wholly aromatic polyesters and aromatic polyethers such as polyphenylene oxide (PPO), polysulfone (PSU) or polyether sulfone (PES).

EXAMPLE

Preparation of liquid-crystalline polymer (LCP); properties

An 11-l stirred autoclave was charged with 1,328 g of terephthalic acid, 1,437 g of p-hydroxybenzoic acid, 308 g of hydroquinone, 298 g of 4,4'-dihydroxybiphenyl, 576 g of 2,7-dihydroxynaphthalene and 3,650 g of acetic anhydride. The contents were initially stirred under nitrogen at 130° C. for 30 minutes, and the temperature was then raised to 290° C. in the course of 4 hours. At this temperature, the pressure was reduced to 25 mbar in the course of an hour, and the contents were stirred for a further 10 minutes. The highly viscous, fiber-forming polymer melt was extruded through a die in the bottom and granulated after cooling in a water bath.

The linear thermal expansion coefficient of this polymer, measured on injection-molded standard bars 50×4×6 mm, in the longitudinal direction was 11 ppm/k. In the bending tests in accordance with German Standards Specification DIN No. 53452, all the test specimens broke before an extreme fiber elongation of 3.5% was reached.

EXPERIMENT 2

Preparation and testing of blends according to the invention

On a ZSK 30/2 extruder, blends of the LC polyester prepared in Experiment 1, a polyethylene terephthalate having a relative viscosity of 1.38 (0.5% strength by weight solution in 1:1 phenol/o-dichlorobenzene at 25° C.) and a polycarbonate based on bisphenol A having a relative viscosity of 1.36 (0.5% strength by weight in dichloromethane at 25° C.) were prepared at 260° C. The blends obtained were cooled in a water bath and granulated, and the dried granules were used to prepare test specimens by injection molding at a melt temperature of 270° C. and a mold temperature of up to 80° C. The test results (23° C.) are given in Table 1, where $\sigma_{MAX}$ indicates the bending stress under maximum force, $\sigma_{3.5}$ indicates the bending stress at an extreme fiber elongation of 3.5% and $\alpha$ indicates the liner thermal expansion coefficient.

TABLE 1

| Experiment No. | 2.1 | 2.2 | 2.3 | 2.4 |
| --- | --- | --- | --- | --- |
| LCP [%] | 30 | 30 | 40 | 50 |
| PETP [%] | 40 | 50 | 30 | 40 |
| PC [%] | 30 | 20 | 30 | 10 |
| Breakage [%] | 0 | 0 | 0 | 0 |
| $\sigma_{MAX}$ [N/mm$^2$] | 83.0 | 80.4 | | 93.4 |
| $\sigma_{3.5}$ [N/mm$^2$] | 64.8 | 64.9 | 90.5 | 87.3 |
| $\alpha$ [ppm/K] | 28 | 33 | 21 | 20 |

COMPARATIVE EXPERIMENT 1

The conditions mentioned in Experiment 2 were also applied to blends prepared from the above-described LC polyester and the polycarbonate mentioned. Test specimens produced from these blends gave the results shown in Table 2.

TABLE 2

| Experiment No. | C 1.1 | C 1.2 | C 1.3 |
| --- | --- | --- | --- |
| LCP [%] | 30 | 40 | 50 |
| PC [%] | 70 | 60 | 50 |
| Breakage [%] | 0 | 80 | 80 |
| $\sigma_{MAX}$ [N/mm$^2$] | 0 | 86.4 | 88.4 |
| $\sigma_{3.5}$ [N/mm$^2$] | 88.4 | 99.4 | 99.7 |
| $\alpha$ [ppm/K] | 51 | 40 | 34 |

COMPARATIVE EXPERIMENT 2

Blends were prepared from the LC polyester of Experiment 1 and PETP under the conditions mentioned in Experiment 2 and processed as described into test specimens which gave the results summarized in Table 3.

TABLE 3

| Experiment No. | C 2.1 | C 2.2 | C 2.3 |
| --- | --- | --- | --- |
| LCP [%] | 30 | 40 | 50 |
| PETP [%] | 70 | 60 | 50 |

TABLE 3-continued

| Experiment No. | C 2.1 | C 2.2 | C 2.3 |
|---|---|---|---|
| Breakage [%] | 100 | 100 | 100 |
| $\sigma_{MAX}$ [N/mm$^2$] | 68.9 | 63.6 | 64.3 |
| $\sigma_{3.5}$ [N/mm$^2$] | 0 | 0 | 0 |
| $\alpha$ [ppm/K] | 48 | 43 | 35 |

COMPARATIVE EXPERIMENT 3

The results of the bend test and the measurement of the thermal expansion coefficient on the same blend components are given in Table 4.

TABLE 4

| | PETP | PC |
|---|---|---|
| Breakage [%] | 40 | 0 |
| $\sigma_{MAX}$ [N/mm$^2$] | 20.8 | 0 |
| $\sigma_{3.5}$ [N/mm$^2$] | 71.4 | 64.6 |
| $\alpha$ [ppm/K] | 80 | 68 |

We claim:
1. A polymeric molding composition, containing:
   (a) 20-70% by weight of a thermotropic liquid-crystalline polymer,
   (b) 10-50% by weight of a polycarbonate which is a polycondensate obtainable by reacting a carbonic acid derivative with an aromatic bisphenol of the formula:

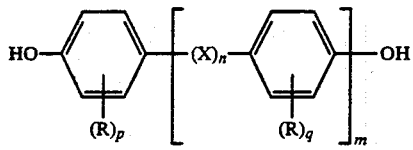

wherein X is alkylene or aralkylene of 1-20 carbon atoms, —SO$_2$—, —S—, —O— or —CO—, n is 0 or 1, m is 0, 1 or 2, p and q are each 0-4, and R is C$_1$-C$_6$-alkyl, C$_1$-C$_4$ alkoxy, halogen or phenyl,
   (c) 10-50% by weight of a polyester, which is obtained from the polycondensation of one or more alkylene glycols of 2-20 carbon atoms and one or more aromatic dicarboxylic acids or esters thereof, the weight percentages (a), (b) and (c) adding up to 100, and
   (d) up to 60% by weight, based on the total amount of proportions (a), (b) and (c), of further polymers, fillers, reinforcing agents, processing aids and other additives.

2. The molding composition as claimed in claim 1, containing
   (a) 30-60% by weight of a liquid-crystalline polymer,
   (b) 30-50% by weight of a polycarbonate,
   (c) 10-20% by weight of a polyester.

3. The molding composition as claimed in claim 1, containing
   (a) 30-60% by weight of a liquid-crystalline polymer,
   (b) 10-20% by weight of a polycarbonate,
   (c) 30-50% by weight of a polyester.

4. The thermoplastic molding composition as claimed in claim 1, having a linear thermal expansion coefficient less than 30 ppm/K in at least one direction.

5. The molding composition as claimed in claim 1, wherein said alkylene glycol is ethanediol or 1,4-butanediol or a mixture thereof.

6. The molding composition as claimed in claim 1, wherein said aromatic dicarboxylic acid is terephthalic acid, isophthalic acid, 1,4-, 1,5-, 2,6- or 2,7-naphthalene dicarboxylic acid or a mixture thereof.

7. The molding composition as claimed in claim 1, wherein said polyester is polyethylene terephthalate or polybutylene terephthalate or a mixture thereof.

8. The molding composition as claimed in claim 1, wherein said polycarbonate is a polycarbonate of the formula:

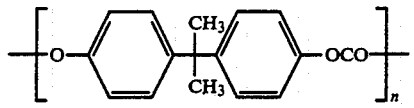

obtainable from bisphenol A and a carbonic acid compound.

* * * * *